No. 870,358. PATENTED NOV. 5, 1907.
D. R. GRIFFITHS.
MOWING MACHINE.
APPLICATION FILED MAY 23, 1907.

Witnesses
Frank B. Hoffman
C. C. Hines

Inventor
David R. Griffiths

By Victor J. Evans
Attorney

UNITED STATES PATENT OFFICE.

DAVID R. GRIFFITHS, OF RICHVILLE, NEW YORK.

MOWING-MACHINE.

No. 870,358.

Specification of Letters Patent.

Patented Nov. 5, 1907.

Application filed May 23, 1907. Serial No. 375,304.

*To all whom it may concern:*

Be it known that I, DAVID R. GRIFFITHS, a subject of the King of Great Britain, residing at Richville, in the county of St. Lawrence and State of New York, have invented new and useful Improvements in Mowing-Machines, of which the following is a specification.

This invention relates to improvements in that class of mowing machines in which a so-termed "finger-bar" carrying the cutting parts is employed; and one object of the same is to provide means whereby the cutters or sections may be maintained in close cutting contact with the cutter-plates or soles usually provided on the fingers or guards of said finger bar, which means embody anti-friction bearing balls adapted to permit a free action of the reciprocatory cutter.

Another object is to provide a simple and efficient construction of means for fastening the clip in position, which may be adjusted to regulate the pressure of the anti-friction bearing on the reciprocatory cutter, and which will also facilitate loosening or removal of the clip in removing the cutter knife when clogged or otherwise rendered partially or wholly inoperative, thereby obviating the inconvenience encountered in detaching clips of ordinary construction.

The invention is illustrated in the accompanying drawing, in which:—

Figure 1:
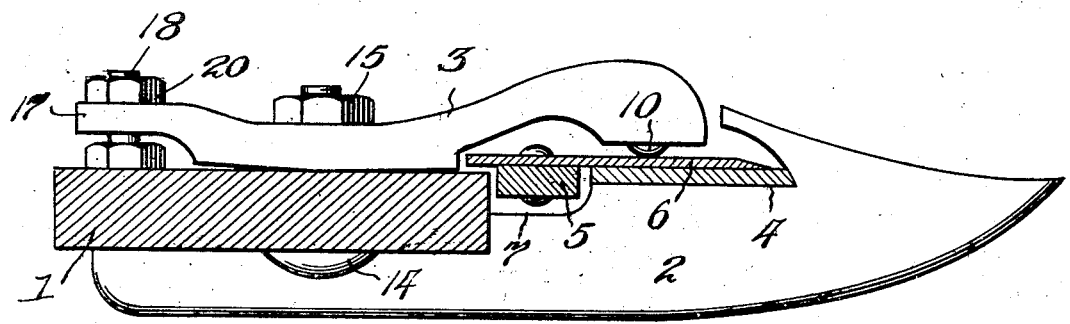
Figure 2:
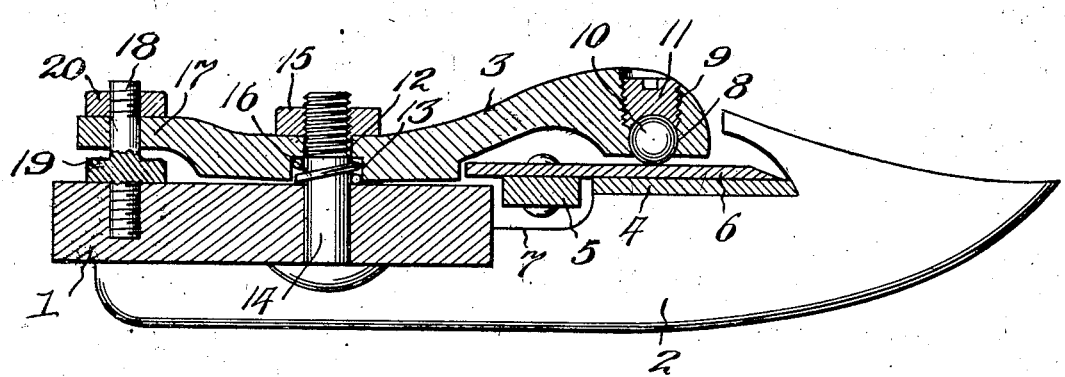

Figure 1 is a section through a finger bar, showing a fastening clip and shoe or sole in elevation. Fig. 2 is a section through the finger bar and clip, illustrating in detail the construction.

Referring to the drawing, the numeral 1 designates the finger bar, on which is carried at desired intervals in its length, the fingers, guards or shoes 2 and clips 3, and 4 designates a stationary cutter plate or sole attached in any suitable manner to the finger. A reciprocatory cutter bar 5, on which are fastened the cutter plates or sections 6, is mounted for movement between the forward or extended end of the clip 3 and the fingers or guards 2, the whole being arranged in working relation to each other in the usual manner, as specifically illustrated in the drawing. The cutter bar 5 operates as usual in a recess 7 formed in the finger for its accommodation, and in the operation of the mower in harvesting grass, grain and other growths, difficulty is encountered by the grass, particularly when wet or moist, being drawn between the cutters 6 and stationary cutter plate 4, or within the recess 7, causing the parts to become clogged and practically inoperative until they have been cleared. At times also and after prolonged use the cutting edges of the cutters become dulled and otherwise deranged, necessitating the removal of the cutterbar for the purpose of grinding or otherwise sharpening said knives. The present invention obviates these objections to a material extent by the provision of means to maintain a close cutting contact between the cutters to prevent admission of the grass between the same, and also facilitates loosening or removal of the clip 3 to enable the cutters to be conveniently freed from entangling grass or removed for such purpose or for sharpening.
The clip 3 preferably comprises a metallic plate of convenient length and width, and is formed in its forward portion, which overhangs the reciprocatory cutter 6, with a partially circular bearing opening 8 communicating with a threaded socket 9. The opening 8 is of proper form to receive an anti-friction bearing ball 10, which is retained in position by a plug 11 inserted within the threaded opening, said plug being provided with a nicked upper end, or otherwise formed for convenient insertion and removal by a suitable form of tool. The lower end of the plug is concaved for contact with a bearing ball, and by its screw-threaded connection said plug is adjustable to maintain the ball in bearing contact with its bearing surface and with the upper face of the cutter plate 6.
One or more of these bearing balls 10 may be provided, and by the use thereof, a reciprocatory cutter 6 is held closely down in engagement with the cutter 4, thus preventing to a maximum extent the admission of grass between them and clogging of the same in use.
The center of the clip 3 is provided with a threaded opening 12 below which is a socket 13. A bolt 14 extends upwardly through the finger bar with its threaded end extending upwardly through the opening 12 and receiving a nut 15, whereby the clip is fastened in position. One or more of these bolts or sockets may be used, and seated within each socket is a coiled spring 16 which exerts its expansive energy upward on the clip and serves to maintain the bolt and nut in firm binding contact. When the nut is relaxed or removed, the spring forces the clip upward, thus enabling the clip to be conveniently elevated or detached for the removal of accumulated grass in the space 7 or disconnection of the cutters for sharpening.

An arm 17 extends rearwardly from the clip and is apertured for the passage of a screw stem 18 working at its lower end in a threaded opening in the bar 1 and provided between said bar and arm with an angular adjusting head 19 adapted for the application of a spanner or wrench. The upper end of the stem is threaded to receive a nut 20 to retain the arm in connection therewith. The said stem 18 is adjustable through the medium of its head to raise and lower the rear portion of the clip to set it accurately to maintain the ball 10 in bearing contact with the reciprocatory cutter 6, the clip in this operation tilting on the connecting bolt 14. When the nuts 15 and 20 are removed the clip as a whole may be detached, in which operation the expansion of the spring 16 tends to elevate the same, thus facilitating the detachment of the clip, as will be readily understood. The spring also serves to give a yielding action between the ball bearing end of the clip and the rear fastening to prevent transmission of objectionable strain from one to the other, allowing sufficient elasticity or yielding to obviate liability of injury.

By the use of the construction described, the removal of the clip or its elevation to any degree for clearance of the cutting mechanism is permitted in a convenient manner, and at the same time provision is made for staying the parts against strain and maintaining the bearing end of the clip in engaging relation with the reciprocatory cutter to hold the latter down to its work.

Having thus described the invention, what is claimed as new, is:—

1. In a mowing apparatus, a finger bar having a guard carrying a stationary cutter, a reciprocatory cutter coacting therewith, a clip, a fastening securing the clip intermediate its ends to the finger bar on which said clip is adapted to tilt, a spring associated with said fastening to normally exert lifting pressure on the clip, an anti-friction bearing on the forward portion of the clip engaging the reciprocatory cutter, and an adjustable fastening connection between the rear end of the clip and the finger bar, whereby the clip may be tilted to regulate the pressure of said bearing.

2. In a mowing apparatus, a finger bar having a guard carrying a stationary cutter, a reciprocatory cutter coacting therewith, a bolt extending upwardly through the finger bar, a clip having an opening for the passage of said bolt and a communicating socket, said clip having portions extending forwardly over the reciprocatory cutter and rearwardly over the finger bar, an anti-friction bearing upon the forward portion of the clip engaging the reciprocatory cutter, an adjustable connection between the rear portion of the clip and the finger bar, an expansion spring housed within the socket about the bolt, and a nut associated with the bolt and bearing on the clip.

In testimony whereof, I affix my signature in presence of two witnesses.

DAVID R. GRIFFITHS.

Witnesses:
MARGARET M. CASHIN,
E. W. ABBOTT.